H. W. McLAUGHLIN.
CUE.
APPLICATION FILED MAY 4, 1911.
1,014,502.
Patented Jan. 9, 1912.
2 SHEETS—SHEET 1.
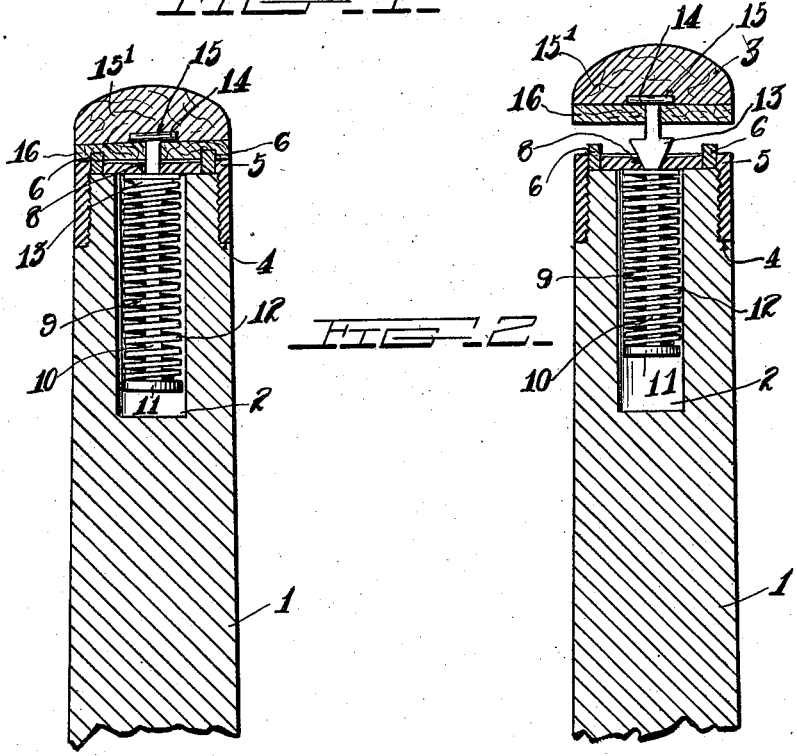
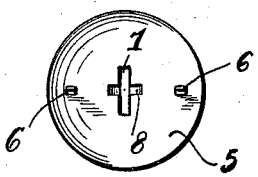
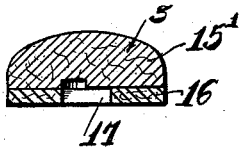
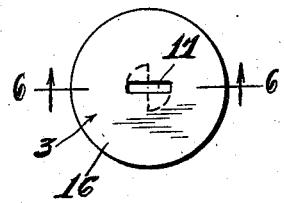
Inventor
H. W. McLaughlin.
Witnesses
By
Attorneys
COLUMBIA PLANOGRAPH CO., WASHINGTON, D. C.

H. W. McLAUGHLIN.
CUE.
APPLICATION FILED MAY 4, 1911.
1,014,502.
Patented Jan. 9, 1912.
2 SHEETS—SHEET 2.
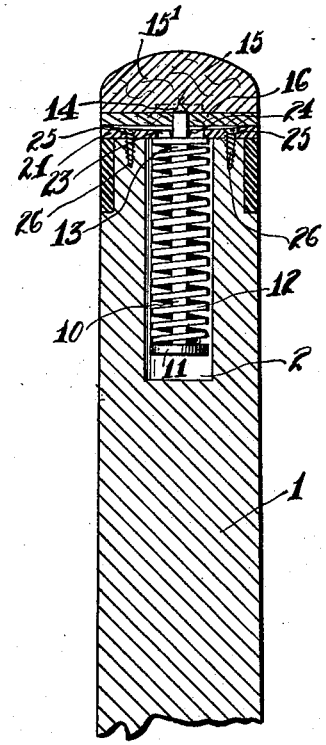
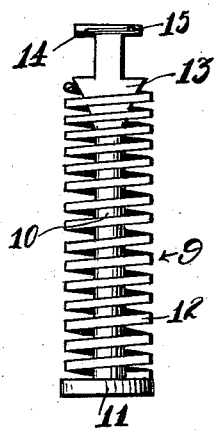
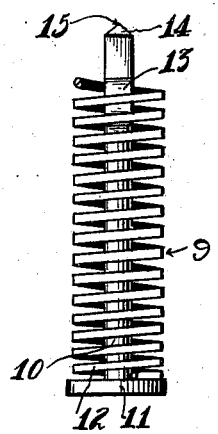
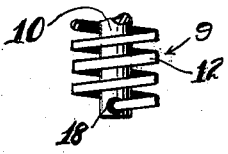
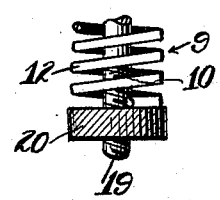
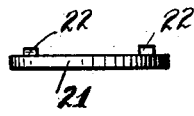
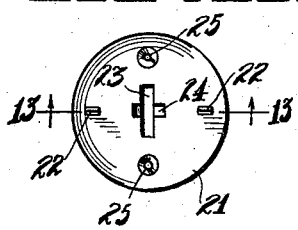
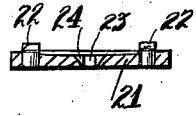
Inventor
H. W. McLaughlin.
Witnesses
By
Attorneys

UNITED STATES PATENT OFFICE.

HARRY W. McLAUGHLIN, OF ASPINWALL, PENNSYLVANIA.

CUE.

1,014,502. Specification of Letters Patent. Patented Jan. 9, 1912.

Application filed May 4, 1911. Serial No. 625,010.

*To all whom it may concern:*

Be it known that I, HARRY W. McLAUGHLIN, a citizen of the United States, residing at Aspinwall, in the county of Allegheny, State of Pennsylvania, have invented certain new and useful Improvements in Cues; and I do hereby declare the following to be a full, clear, and exact description of the invention, such as will enable others skilled in the art to which it appertains to make and use the same.

My invention relates to new and useful improvements in cues, and more especially to a means for securing tips thereon, and the object of my invention is to provide means for the ready attachment or detachment of the tip and cue.

A further object of my invention is to provide means by which the tip will be secured to the cue without the use of glue, cement or other adhesive.

A further object of my invention is to provide a securing means of the above described character which may be used with the customary form of tip, as supplied by the manufacturer, without the necessity of changing it in any manner to adapt it for use with my improved fastener.

A still further object of my invention is to so construct my fastening device that it may be used equally well both with cues of the ordinary construction, formed entirely of wood, and with the cues which are provided with an ivory or bone ferrule at their ends.

With these and other objects in view, my invention will be more fully described, illustrated in the drawings and then specifically pointed out in the appended claim, which is attached to and forms a part of this application.

In the accompanying drawings which illustrate a preferred embodiment of my device, Figure 1 is a medial vertical section of the point or small end of a cue showing my improved fastening means in operation. Fig. 2 is a similar view showing the tip partially secured in place. Fig. 3 is a similar view showing a slightly modified form of fastener for use with cues having ferruled ends. Fig. 4 is a plan view of the cap used in the form of cue shown in Figs. 1 and 2. Fig. 5 is a bottom plan view of the customary form of tip. Fig. 6 is a section through the line 6—6 of Fig. 5. Fig. 7 is a side elevation of the fastening means proper. Fig. 8 is an end elevation thereof. Figs. 9 and 10 are fragmental elevations showing slightly modified forms of fasteners. Fig. 11 is a side elevation of the cap used with the form of cue shown in Fig. 3. Fig. 12 is a plan view of the cap shown in Fig. 11. Fig. 13 is a vertical section through the line 13—13 of Fig. 12.

For the sake of convenience in illustration the small end of the cue only has been shown and in the accompanying drawings in which similar reference numerals designate corresponding parts throughout, the cue has been designated by the numeral 1, and as shown the end of the cue is provided with a centrally located cylindrical bore 2, adapted to receive the fastening means for securing the tip 3 in place. The end of the cue is reduced to form an annular shoulder 4 and a cap 5, preferably formed of brass, steel or other metal, is adapted to be seated over the reduced portion of the cue with its lower edge resting upon said shoulder, said cap being detachably secured to the cue in any desired manner, preferably by providing its inner face with screw threads adapted to engage with similar threads formed upon the outer face of the cue. This cap acts as a ferrule to strengthen the end of the cue and prevent the same from splitting and at the same time provides an anchor plate for my securing device. As best shown in Fig. 4 of the drawings the top of the cap 5 is provided with a pair of upwardly extending knife edged lugs 6, positioned one upon either side of the center and extending in a radial direction. The top of the cap is further provided with a slot 7, centrally located between said lugs and at right angles thereto, and intersecting said slot and at right angles thereto is a second slot 8 the upper portion of which is slightly shorter than the slot 7, while its end faces converge downwardly whereby the length of the bottom portion of the slot is equal to the width of the slot 7.

The fastening means proper which as a whole is designated by the numeral 9, and which as best shown in Figs. 7 and 8 of the drawings, consists primarily of a shank 10 provided with a flanged end 11 and surrounded by a helical spring 12 the lower end of which is seated upon the flange 11. The upper end of the shank 10 is enlarged to form a substantially triangular shaped head 13 slotted as shown to form the T-shaped member 15, the upper face of which is preferably beveled to form knife edges 14, the purpose of which will be hereinafter more fully explained.

In practice the fastener 9 is passed upwardly through the slot 7 of the cap 5 until its head portion 13 is above the top of the cap, the spring 12 being compressed between the flange 11 and the cap in the meantime, when the fastener is turned through an angle of ninety degrees and released, when the spring draws it back to the position shown in Fig. 2 of the drawings with the inclined faces of the head member 13 seated in the slot 8, which thus serves to maintain the portion 14, at a distance above the cap. The cap is then positioned upon the end of the cue, the shank portion of the fastener being seated in the recess 2 formed therein. In this position of the fastener the cue is ready for the tip.

The tip as illustrated in Figs. 5 and 6 is of the customary construction and consists of an outer layer of leather 15' secured to a disk of leather or fiber 16 by means of glue or cement. This is the usual form of tip and as is customary with tips of this form the inner or base member 16 is provided with a centrally located slot 17, the ordinary purpose of which is to assist in more firmly gluing the tip to the end of the cue, as the glue in its liquid form is forced upwardly into this slot and upon drying forms a solid lug, which acts to prevent any lateral movement of the tip. In constructing my securing device I have taken advantage of this well known principle of providing the member 16 with a slot, thereby doing away with all necessity of using adhesives, or specially constructed tips.

In applying the tip to my cue I position the same with the slot in engagement with the horizontal portion of the cue member 14, when a slight downward pressure will force the latter into position between the upper and lower members of the tip. The tip is then revolved through an angle of ninety degrees, the knife of the member 14 serving to open a passage between the members 15 and 16, when the horizontal portion of the member 14 will be at right angles to the slot 17, thus firmly securing the tip to the fastener. During this operation the fastener is prevented from turning by means of engagement of its head member 13 and the converging slot 8 of the cap. With this tip thus positioned and secured to the fastener, force is exerted upon the tip to draw the same away from the end of the cue until the head 13 is released from the slots 8, when the tip together with the fastener is further revolved ninety degrees and then again released. Upon being thus released the spring 12 draws the head of the fastener down through the slot 7 until the lower face of the tip rests upon the knife edged lugs 6. When in this position a slight tap with a mallet or similar tool will drive the tip home, embedding the lugs 6 in the member 16 of the tip and thereby holding the same against further rotary movement.

Figs. 9 and 10 show a slightly modified form of fastener, the difference consisting in different ways for securing the lower end of the spring 12 against longitudinal movement upon the shaft. As shown in Fig. 9 the lower end of the shaft 12 is provided with an aperture 18 through which the lower end of the spring 12 is passed and then bent over upon itself to form an eye thus securing it in place. In Fig. 10 the lower end of the shaft 10 is screw threaded as at 19 and provided with a milled nut 20. This latter form is perhaps preferable as it provides a ready means for regulating the tension of the spring 12.

Figs. 11, 12 and 13 show a modified form of cap for use with cues which are already provided with a ferrule of ivory or bone. This cap as shown consists of a disk of metal 21 provided with lugs 22 and slots 23 and 24, all similar to the lugs and slots previously described in the cap 5. This disk is further supplied with screw receiving apertures 25 by means of which it may be secured to the end of the cue by screws 26 as shown in Fig. 3 of the drawings.

If it becomes necessary at any time to remove the tip it is only necessary to raise the same until the head of the fastener is drawn out beyond the cap and to then revolve the same through an arc of ninety degrees until the head is again seated in the slot 8. The tip may then be revolved ninety degrees in the opposite direction when it may be readily removed from the fastener, leaving the cue and fastener in position to receive a fresh tip.

It will readily be seen from the above description that tips of the customary form may be readily applied to a cue equipped with my fastening device without necessitating any special preparation of the tip and without the use of any form of adhesive. It will further be seen that I have accomplished this purpose without unduly weakening the cue itself, and that my fastening device is simple in construction and one which may be readily and quickly applied to cues now in use.

Another and great advantage possessed by my tip fastener is that a tip may be quickly removed and replaced by another, only a few seconds being required in the operation, and the player is therefore not required to change cues during the course of a game because of injury done to the tip of the cue while playing.

What I claim is:—

The combination with a cue having a recess in its smaller end and a tip for said cue, of means for securing said cue and tip together, said means consisting of a cap secured to said cue end and provided with intersecting slots, a shank having an enlarged head slidable through one of said slots and adapted to be seated in the other, said shank extending into said recess, means carried by said head for engaging said tip, means carried by said shank and co-acting with said cap for yieldably holding the tip against vertical movement, and means carried by said cap for holding said tip against other than vertical movement.

In testimony whereof, I affix my signature, in presence of two witnesses.

HARRY W. McLAUGHLIN.

Witnesses:
W. P. DOUGLAS,
W. S. GIBSON.

Copies of this patent may be obtained for five cents each, by addressing the "Commissioner of Patents, Washington, D. C."